Sept. 15, 1964  J. A. LINDSAY  3,149,015
HEAT SEALING TOOL
Filed Dec. 13, 1962
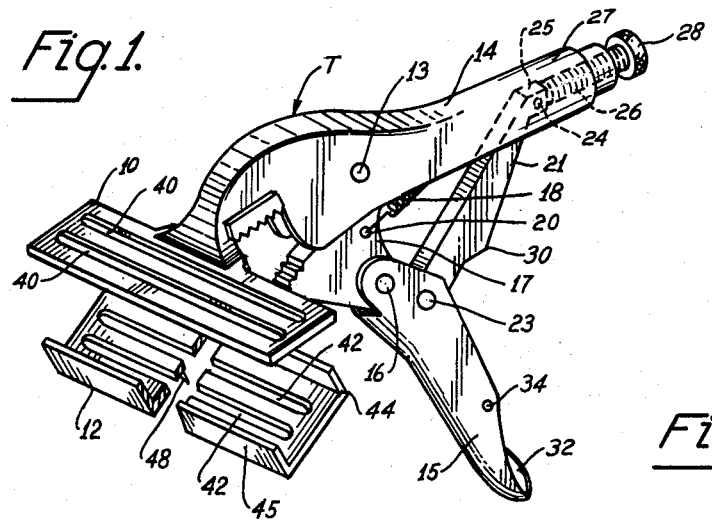
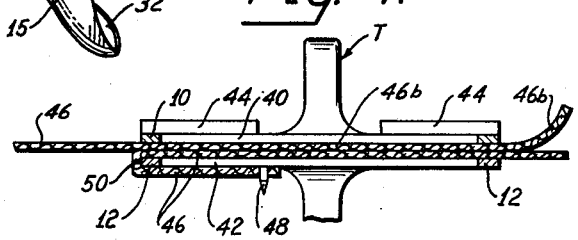
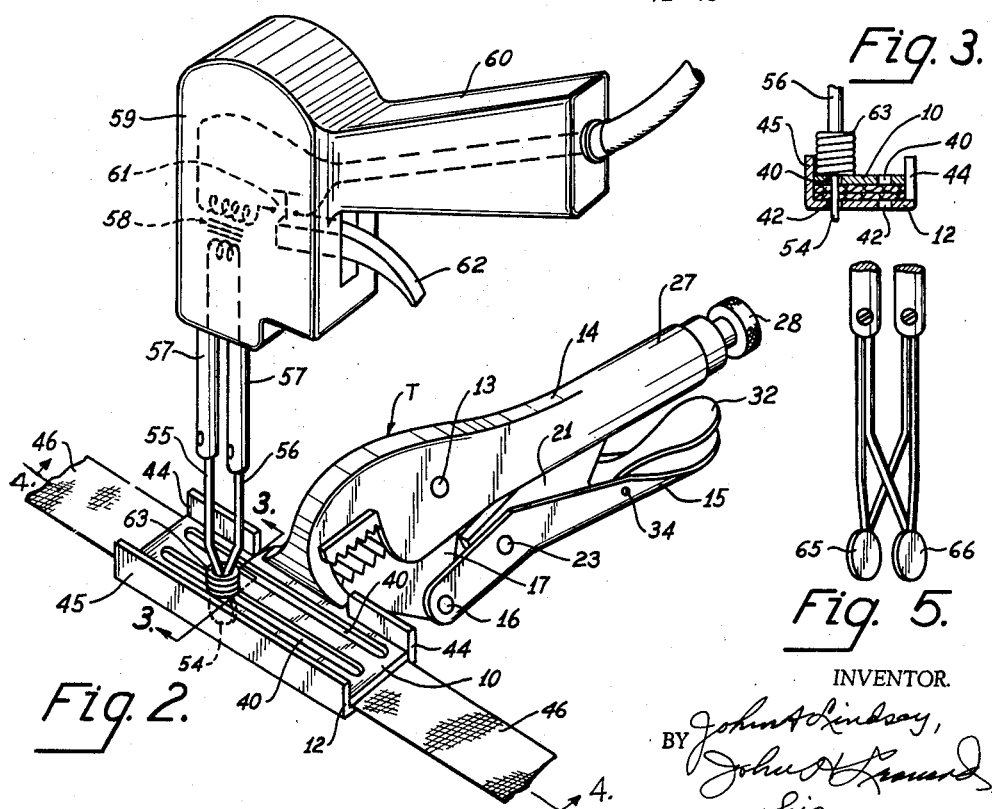
INVENTOR.
BY John A. Lindsay,
John H. Leonard
his ATTORNEY.

United States Patent Office 3,149,015  
Patented Sept. 15, 1964

3,149,015  
HEAT SEALING TOOL  
John A. Lindsay, 1919 W. Pleasant Valley Road, Parma, Ohio  
Filed Dec. 13, 1962, Ser. No. 244,393  
4 Claims. (Cl. 156—502)

This invention relates to a heat fusion bonding device and more particularly to a heat bonding hand tool adapted to bond the ends of synthetic tapes and the like, and is an improvement on the tool disclosed in my United States Letters Patent No. 2,974,717, issued March 14, 1961, and entitled Heat Sealing Tool.

As therein set forth, in certain commercial ironing apparatus, large ironing rolls drive sheets and the like over heated platens for purposes of ironing the sheets. A number of synthetic, heat-fusible cloth tapes or bands are placed as belts around the rolls in parallel relation to prevent the sheets from wrapping around the rolls and forming undesirable overlapping folds therein during the ironing operation. These tapes or bands break frequently and must be spliced or replaced. The spliced, or new, joints must present smooth surfaces which will not make an impression on the sheet.

An object of the present invention is to provide an improved heat bonding hand tool for fusing portions of the overlapped ends of a synthetic tape into a smooth, secure joint.

A further object is to provide an electrically heated heat bonding hand tool and an improved tape holder, for heat bonding such tapes.

Other objects and advantages of the invention will become apparent from the following description taken in conjunction with the drawings, wherein:

FIG. 1 is a perspective view of the tool of the invention, showing the jaw members thereof in open position, with a portion of the lower jaw member being broken away to show the tape retaining means thereof;

FIG. 2 is a perspective view of the tool shown in FIG. 1, showing the tape clamping jaws in clamped position with overlapped tape end portions disposed therebetween, and showing the electric heated bonding tool in an operative position;

FIG. 3 is an enlarged cross-sectional fragmentary view of the tool shown in FIG. 1, showing the jaws in closed position with overlapped tape end portions disposed therebetween, and the bonding tool blade in operating position, and is taken on line 3—3 of FIG. 2;

FIG. 4 is a fragmentary longitudinal sectional view taken on line 4—4 of FIG. 2; and FIG. 5 is a perspective view of a dual blade of the heating tool.

As described in the above patent, the invention is directed to a heat bonding tool comprising a holder and a heater. The holder is in the form of pliers having a pair of normally open, spaced, planular clamping jaws aligned with each other and movable flatwise toward and away from each other into tape clamping and releasing positions, respectively. The jaws are adapted to receive end portions of synthetic heat fusible tape, such as nylon tape, in overlapped relation therebetween when the jaws are in open position and to clamp the end portions in face to face juxtaposition when the jaws are in closed position.

In order to clamp the overlapped end portions between the jaws of such a structure, while holding the plier handles in one hand, self-locking pliers with a retaining pin for detachably securing one of the end portions of the tape in proper position relative to one of the jaws preparatory to overlapping it with the other end portion are provided.

In practice, while holding the pliers in one hand with the jaws in released position, one end portion of the tape is taken in the other hand and thereby hooked onto the retaining pin and then passed between the open jaws. The tape is then tensioned lightly and its other end passed between the jaws in overlapping relation with the first end portion and so held by said other hand. While so held, the jaws are closed by the said one hand. The pliers are thus squeezed to self locking position, whereupon said other hand is free to, and does, apply the heating member to the clamped end portions.

Referring to the drawings, there is shown a heat bonding tool T of the invention. The tool comprises a holder in the form of self-locking pliers having a pair of coacting, planular jaws 10 and 12 pivoted together at 13 for aligned movement flatwise toward and away from each other from clamping to releasing positions. The pliers have a handle 14 which extends rearwardly from the jaw 10, and a second handle 15 transversely pivoted at its inner end at 16 to a rearward extension 17 of the jaw 12. A coiled tension spring 18 is secured at its upper end to the handle 14 rearwardly of the pivot point 13 and the other end of the spring is secured in the aperture 20 on the rearward extension 17 of the jaw 12. The spring tends to resiliently pull the jaws 10 and 12 to open or released position in response to operation of the handles.

A fulcrum bar or lever 21 pivotally links the handles 14 and 15 together and is rotatably connected at its inner end to the handle 15 by a pivot 23. At its other end, the bar 21 is connected by a pivot 24 to a slide head 25, which is slidably telescoped within the bore 26 of a tubular outer end portion 27 of the handle 14. A bolt 28 is threaded into the outer end of the bore 26, as shown, the inner end of such bolt being adapted to contact the head 29 of the fulcrum lever or bar 21. The fulcrum lever 21 is provided with a fulcrum shoulder or abutment 30, which is contacted by the inner end portion of a releasing lever 32. The handle 15 is U-shaped in transverse section and the lever 32 is pivotally secured intermediate its end portions to the handle 15, interiorly thereof, at the point 34.

The action is such that when the jaws 10 and 12 are closed upon an object by pressing the plier-like handles 14 and 15 towards one another, the lever 21 passes dead center defined by the centerline drawn through the centers of pins 16, 23 and 24, thereby closing the jaws firmly. When the lever 21 passes beyond dead-center, the jaws are locked in position and grip the object without further closing pressure on the handles. Such locked position may be adjusted by the bolt 28 depending on the size of the object held between the jaws 10 and 12. The locked grip may be easily released by either pressing downward or pulling upward on the outer end of the lever 32, which upon being rocked either way will forcibly move the handle 15 slightly outwardly from the handle 14 to carry the inner end of the lever 21 back over the aforementioned center line to a partially released position such that the action of the spring 18, as well as the releasing pressure of the object tending to spread the jaws, function to open the wrench to fully released position. More detailed operational and structural details of the wrench T are set forth in United States Patent No. 2,514,130 of Harold T. Jones, issued July 4, 1950, and are not fully described herein since the specific details thereof form no part of the present invention.

The jaw 10 is preferably formed of a flat planular plate and, instead of having a plurality of apertures therein and uniformly distributed thereover, the jaw 10, as in the above patent has apertures 40 which are narrow and are elongated endwise of the jaw. The jaw 12 also is a flat, planular plate having narrow elongated apertures 42 which are disposed in alignment with the apertures 40, respectively, when the jaws are in closed position.

Disposed on the inner and outer longitudinal edges of the plate 12 are upstanding guide flanges 44 and 45, respectively, which function as guide or alignment means to align the two end portions of the tape or band 46 in proper position for clamping between the jaws. They also may act as a guide for the electrically heated bonding blade. As mentioned hereinbefore, it is difficult to hold the pliers in one hand and then manipulate the two free end portions of the tape with the other hand. Accordingly, a tape retaining pin 48 is provided.

In practice, with the jaws 10 and 12 in open or released position, an end portion 46a of the tape 46 is pierced or hooked onto the retaining pin 48 which is located on the undersurface of the jaw 12 and extends outwardly from the plane thereof. Next, the tape end portion 46a is laid around the end 50 of the jaw 12 and thence between the open jaws and flatwise on the upper surface of the jaw 12 between the guide flanges 44 and 45 thereon. While one end is held in this position merely by a slight pull exerted by the pliers held in one hand, the other end portion 46b of the tape is grasped in the other hand and positioned, under slight tension, between the open jaws and in face to face juxtaposition with the end portion 46a between the flanges 44 and 45. Thereupon, the jaws are moved to closed clamping position. With the tape end portions 46a and 46b so clamped between the jaws, the tape is then ready for the bonding operation.

As aforementioned, in a heat bonding tape of the type described herein, the end portions of the tape may be connected or joined by overlapping the end portions in parallel fashion, retaining such overlapped portions together in clamped relation by a suitable clamping means, and then applying heat of predetermined temperature to the overlapped joint. The heat causes the overlapped end portions to melt and fuse together to effect a joint substantially equal in strength to that of the tape itself.

It is necessary for effective bonding that the total lineal length of all bonded edges be large in proportion to the width of the tape. For this purpose, instead of isolated apertures, the tape is to be bonded with bonded portions which are elongated and extend lengthwise of the tape, thus providing a great total length of bonded edges without reducing the strength of the tape at the overlapped portions.

For this purpose an electrically heated thin blade is employed, the blade being heated continuously during operation. The heating member of the present tool is one available on the market. It is of the manual type, similar to an electric soldering gun, except that the operative tip is in the form of a thin flat blade which almost instantly heats to operating temperatures when the power is turned on, and almost instantly cools to room temperature when the power is turned off. The heating member shown comprises a thin conductor blade 54 having two rigid electrical leads 55 and 56, respectively, rigidly connected thereto.

The leads are clamped into terminals 57 of a secondary of a step-down transformer 58, indicated diagrammatically in FIG. 2, which is mounted in a gun body 59 having a supporting handle 60. An electric cord is provided for connecting the transformer to an A.C. voltage source. A switch 61 operated by a manually operable trigger 62 is provided for turning the power off and on.

In these devices, the secondary is usually one of very few turns so that it heats very quickly to operating temperature when the power is turned on and cools quickly to a safe temperature when the power is turned off.

It has, therefore, distinct advantages in the combination of the present invention over the gas fired heating member of the above United States Letters Patent in that it heats and cools more quickly and does not require a large mass of heated metal as a heat reservoir for assuring proper heating of the bonding surfaces. Likewise, no flames are present, and consequently fire hazards are greatly reduced. The heat is concentrated in the very small mass of metal forming the blade, but the current flow is sufficient to assure that the blade is kept sufficiently heated at all times, whereas if pins were to be electrically heated, it would have to be done indirectly by conduction from a large mass of metal as in the gas fired heating member above described.

The bonding operation itself is quite simple and effective. After the overlapped tape ends are clamped between the jaws 10 and 12, the blade 54 is inserted in one pair of aligned slots 40 and 42, passing instantly through the tape exposed therebetween and fusing the resultant newly exposed edges of the tape together. The blade is drawn along the aligned slots from end to end at a rate sufficient to cut or melt a continuous slot through the overlapped tape ends from one end of the aligned slots 40 and 42 to the other and concurrently fuse together the edges defining the slot in the tape ends.

The blade can be inserted originally at any position along the slot and slid to and fro edgewise endwise of the slot until an effective bond is obtained.

This operation is repeated for each pair of aligned slots 40 and 42.

The blade is extremely thin so that only a very minor amount of the cross section of the tape is destroyed by melting. Even the melted material tends to remain and strengthen the exposed edges of the tape at the slot. Due to the length of each slot and its limited width, the total length of bonded edges is several times the width of the tape. Further when the tape is tensioned in operation, the slots tend to close up, leaving no open pattern as do the apertures shown in the above patent.

The slots 40 and 42 preferably are uninterrupted throughout their length as a series of slots end to end would leave bridging material across the slot between portions of the tape at opposite sides of each slot, thus reducing the length of bonded edges and tending to oppose closing of slots when the tape is tensioned during operation.

The heating member is provided, in turn, with an abutment member 63 near the blade 54. This member may engage flanges 44 and 45, selectively, and space the blade at the proper distance from the engaged flange to align the blade, transversely of the jaw, with the aligned slots nearest to the engaged flange. Also, the member 63 limits the depth of insertion of the blade 54 into the slots so that the leads do not come into contact with the jaws or enter the slots.

In the heating member shown for illustration, only one blade is provided, as the saving in time for making two simultaneous bonds as compared to two successive bonds is not great compared to the time required for clamping the ends together. However, if two simultaneous bonds are desired, the gun may be provided with two blades 65 and 66, connected in parallel, as illustrated in FIG. 5 and spaced apart in parallel face to face spaced relation to each other, the spacing corresponding to the spacing of the slots 40 from each other.

Having thus described my invention, I claim:

1. A heat sealing tool for fusibly bonding overlapping end portions of heat-fusible thermoplastic tape comprising a pair of parallel spaced planular clamping jaw members positioned for aligned movement flatwise toward and away from each other from releasing to clamping positions and arranged for receiving in overlapping face-to-face relation therebetween, the tape end portions to be joined and for clamping them in said relation when the jaws are in clamping position, clamping means for moving said jaw members toward and away from each other into and out of clamping position, each of said jaw members having therein a plurality of elongated apertures in laterally spaced relation to each other and positioned so that their long dimensions extend lengthwise from the tape end portions when the tape end portions are clamped in said relation, the length of each aperture being many times its width, the apertures of one jaw member being aligned with the apertures of the other jaw member, respectively, when the jaw members are in said clamping position, and a hand supportable electric heating member having a small thin heating blade connected in an electric heating circuit and directly heated by current flowing through the blade, said blade being receivable through aligned apertures and clamped tape end portions exposed therein and movable edgewise of the blade endwise of the aligned apertures.

2. The tool according to claim 1 wherein each aperture is continuous and uninterrupted for its full length and extends, lengthwise, from near one end to near the other end of its associated jaw.

3. The tool according to claim 1 wherein said one jaw member has guide flanges at its lateral margins for constraining the tape end portions from lateral displacement from said aligned, parallel, overlapped position on said one jaw member preparatory to, and during, disposal of the jaw members in clamping position, and said heating member carries an abutment member adjacent the blade and adapted to engage each flange, successively, and space the blade from the engaged flange in alignment, transversely of the associated jaw, with the aperture nearest the engaged flange.

4. The tool according to claim 1 wherein the heating member carries an abutment member adjacent the blade to limit the depth to which the blade can be passed through the aligned apertures.

References Cited in the file of this patent

UNITED STATES PATENTS

| | | |
|---|---|---|
| 2,701,835 | Anton | Feb. 8, 1955 |
| 2,957,513 | Schneider et al. | Oct. 25, 1960 |
| 2,974,717 | Lindsay | Mar. 14, 1961 |
| 3,013,930 | Serbin | Dec. 19, 1961 |

FOREIGN PATENTS

| | | |
|---|---|---|
| 1,141,677 | France | Mar. 18, 1957 |
| 212,741 | Australia | Jan. 30, 1958 |